United States Patent [19]

Samuels

[11] 4,397,635
[45] Aug. 9, 1983

[54] READING TEACHING SYSTEM

[76] Inventor: Curtis A. Samuels, 1220 Oxford St., Berkeley, Calif. 94709

[21] Appl. No.: 350,447

[22] Filed: Feb. 19, 1982

[51] Int. Cl.³ .............................................. G09B 17/00
[52] U.S. Cl. ..................................... 434/178; 434/308
[58] Field of Search ............... 434/178, 308, 309, 310, 434/311, 312, 313, 314, 315, 316, 317, 318

[56] References Cited

U.S. PATENT DOCUMENTS

| | | | |
|---|---|---|---|
| 3,170,247 | 2/1965 | Kovacevich | 434/178 |
| 3,488,867 | 1/1970 | Lyon et al. | 434/312 |
| 3,571,951 | 3/1971 | Siegel et al. | 434/178 |
| 3,888,024 | 6/1975 | Elliott | 434/310 |
| 3,968,576 | 7/1976 | Taylor | 434/180 |
| 4,189,852 | 2/1980 | Chatlien | 434/178 |

Primary Examiner—William H. Grieb
Attorney, Agent, or Firm—Townsend and Townsend

[57] ABSTRACT

A reading teaching system for use with an audio-visual projection device. Lines of a textual passage are displayed in the baseline display portion of a display area. As each word is spoken the corresponding word in the baseline display portion is also displayed in the main display portion of the display area. Several speech parameters are conveyed by the manner in which the chosen word is displayed. The loudness or volume is represented by the size of the chosen word while the pitch is represented by the height of the chosen word above the baseline display portion. The speed at which each word is spoken is indicated by the spacing of the letters of the chosen word in the main display portion. The temporal spacing between the words is indicated by the spacing between the chosen words in the main display area. Other speech parameters, such as mood, can be indicated by special coloration or configuration of the illustrated chosen word.

18 Claims, 14 Drawing Figures

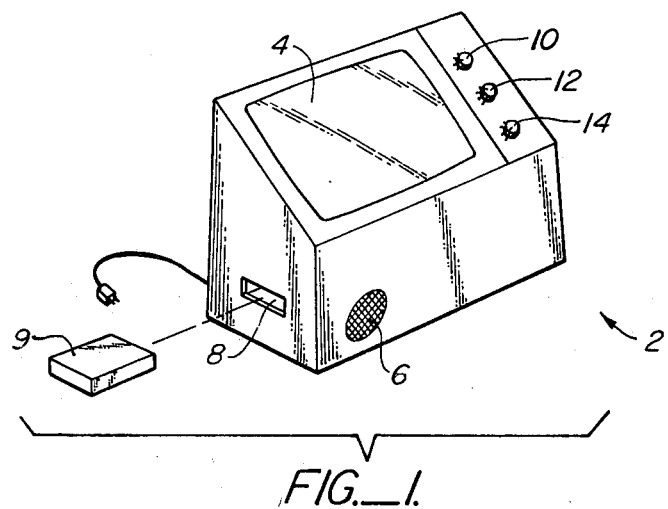
FIG._1.
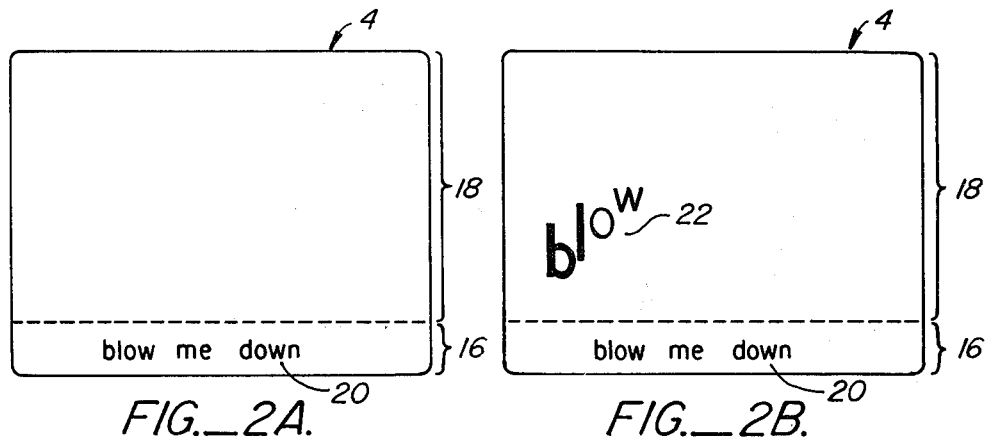
FIG._2A. FIG._2B.
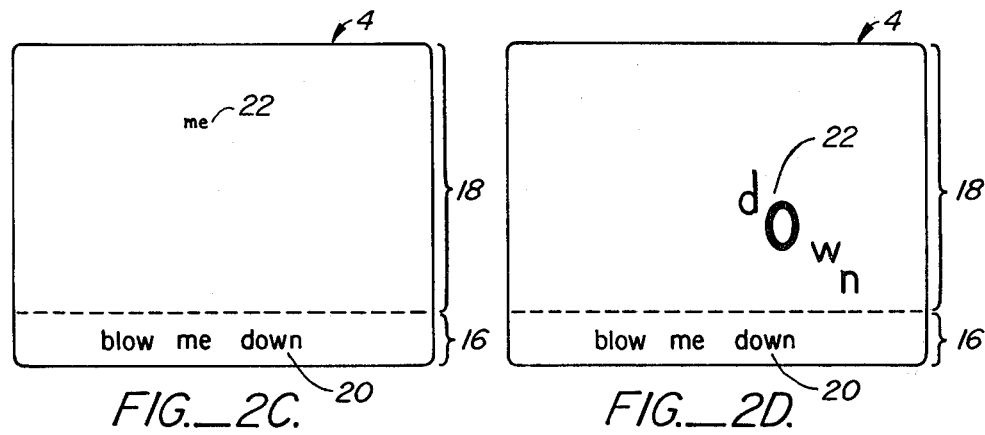
FIG._2C. FIG._2D.

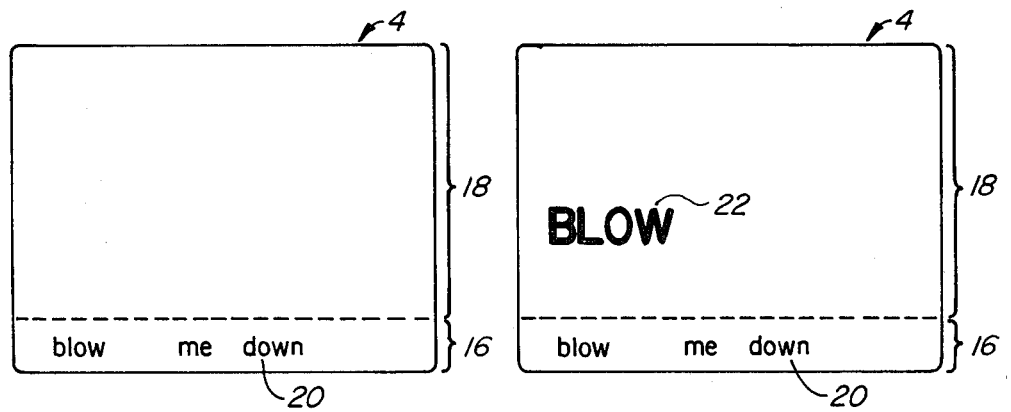
FIG._3A.  FIG._3B.
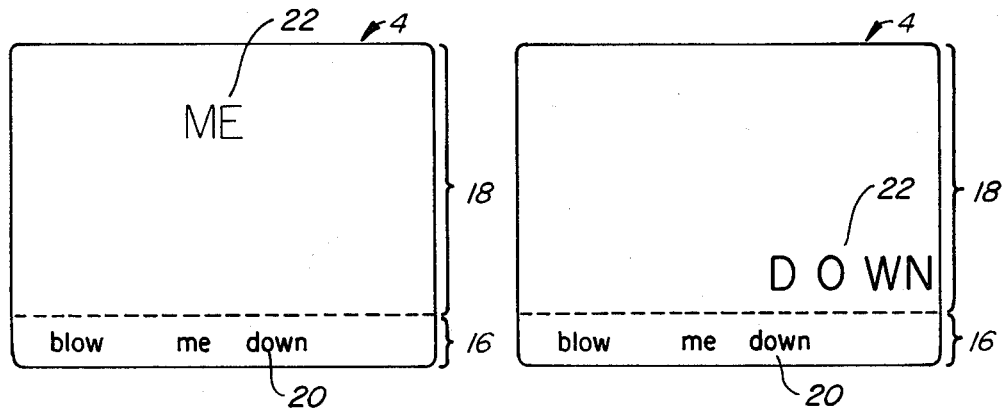
FIG._3C.  FIG._3D.

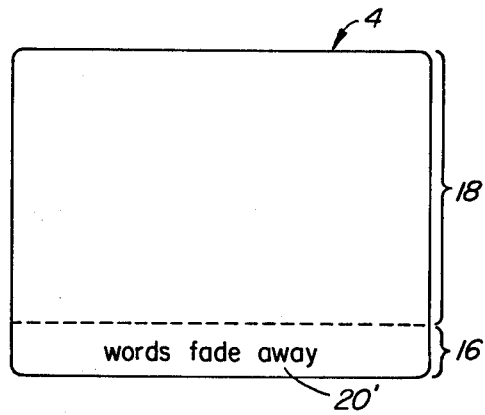
FIG._4A.
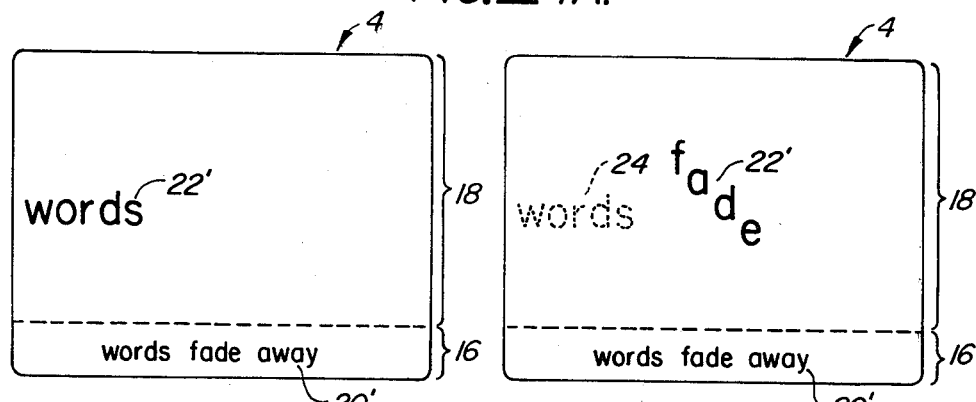
FIG._4B.  FIG._4C.
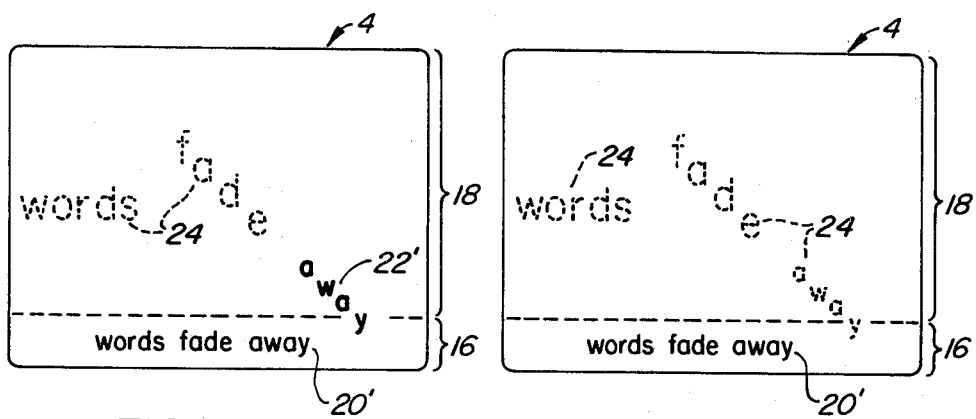
FIG._4D.  FIG._4E.

READING TEACHING SYSTEM

BACKGROUND OF THE INVENTION

This invention is related to reading teaching systems, particularly of the type using an audio-visual device for the simultaneous visual display and vocalization of successive words of a written work.

Most infants learn to understand the spoken language that surrounds them by the time they are two years old or so. Therefore, they possess the cognitive capability required to process language information by that time. However the ability to read written words typically is delayed several more years.

One reason for this lies with the way written works are laid out. The standard printed page employs a word-form design that places equally sized words successively and equally spaced on a flat line and all in one color; this is repeated again and again to compose each paragraph. Although certain variations do occur (proper nouns are capitalized, a space is placed between each word and two spaces follow each sentence), for the most part the visual arrangement is monotonous and relies mainly on the reader's advanced knowledge of the word meaning and of the grammar.

The environment for the succession of spoken words is much richer in information. Different words are emphasized to greater and lesser degrees by the speaker systematically varying the volume and pitch of their speech. The speed or pacing of word flow is varied so that sometimes phrases come out rapidly, as when the speaker is excited, sometimes slowly, as when tired or bored. Also, in spoken conversation prosodic variation, that is pitch or intonation, is used to signal various things such as questions or commands.

None of these audible devices that help us to understand spoken language, and, quite frankly, keep us interested, are employed in the written wordform. Each of the sources of information that is a natural part of talking and hearing is omitted from written communication except for the words themselves.

Perhaps in partial response to this, there have been developed various means for the simultaneous projection of words onto a screen or other viewing device and the vocalization of those words. A somewhat modified version of such devices is shown in U.S. Pat. No. 3,968,576 to Taylor. With the Taylor apparatus the printed words are projected onto a screen in conjunction with their being spoken. The spoken words are delayed somewhat to allow the visual image to be dealt with before the word is spoken. However, none of the prior art methods or devices have been able to simply and effectively convey a number of speech parameters, including volume, pitch and speed, visually in a way which is easy to understand and maintains the reader's attention.

SUMMARY OF THE INVENTION

A reading teaching method is disclosed which uses an audio-visual projection device. Textual material and the vocalization corresponding to those words are recorded on a suitable medium according to the type of audio-visual device used. The audio-visual device includes a display area for projection of visual information and an audio player for vocalizing the audio information.

Portions, typically lines, of the textual material are displayed along a baseline display portion of the display area. Although the baseline display portion is typically along the lower edge of the display area, it could be elsewhere in the display area if desired. As each sequential word is chosen and spoken, the corresponding chosen word in the baseline display area is also displayed (or animated) at the main display portion of the display area. Several speech parameters are conveyed by the manner in which the chosen word is displayed. The loudness or volume is represented by the size of the chosen word while the pitch is represented by the relative height of the chosen word in the display area. The speed at which each word is spoken is indicated by the spacing of the individual letters of that chosen word in the main display portion. The temporal spacing between the words is indicated by the spacing between the chosen words. Other speech parameters, such as mood, can be indicated by special coloration or configuration of the illustrated chosen word.

A primary feature of the invention is the pairing of written and spoken word forms in a manner in which several speech parameters inherent in the spoken words are displayed visually through the form of the particular word spoken simultaneously with the spoken presentation of that word. The words are in effect animated to reflect the quality of its pronunciation.

The method of the invention facilitates a person's learning to read: first by pairing the written and spoken word form, second by enriching the written word with more of the information conveyed when it is spoken, and third by dynamically presenting moving words and changing word forms so that even a small child's short attention span is accommodated.

Other features and advantages of the present invention will appear from the following description in which the preferred embodiment has been set forth in detail in conjunction with the accompanying drawings.

BRIEF DESCRIPTION OF THE DRAWINGS

FIG. 1 is a perspective view of a filmstrip viewer for use with the method of the present invention.

FIGS. 2A-D are a series of display areas illustrating visual display aspects of the present invention.

FIGS. 3A-3D are a second series of the display areas of FIGS. 2A-2D.

FIGS. 4A-4E are a third series of display areas illustrating a further visual aspect of the present invention.

DETAILED DESCRIPTION OF THE PREFERRED EMBODIMENT

Turning now to FIG. 1, a film-strip viewer 2 is shown including a display area 4, a speaker opening 6, a cartridge slot 8, an on/off and volume control 10, a brightness control 12, and a speed control 14. Film strip viewer 2 is conventional in structure. Other audio-visual devices, such as a computer and monitor, motion picture projector with a sound track player and a viewing screen, video tape player and television, or a video disk player and television may be used as well. The particular audio-visual projection system chosen is therefore not a part of this invention.

Turning also to FIGS. 2A-2D and FIGS. 3A-3D, the method of the present invention will be described. Display area 4 is partitioned in the figures for purposes of explanation into a baseline display portion 16 along the lower edge of display area 4 and a main display portion 18 occupying the remainder of display area 4. The textual reading matter is contained on a film cartridge 9 in a line by line format. Each line of text is projected onto baseline display portion 16 as baseline words 20. The spacing between chosen words 22 varies depending upon the temporal spacing between the words as they are spoken or vocalized. That is, the pause between "blow" and "me" is less than between "me" and "down." This temporal spacing is also indicated in FIGS. 3A-3D by the spacing between the individual baseline words 20. As shown in FIGS. 2B-2D and 3B-3D as each of the three words, "blow," "me" and "down," is spoken, that chosen word 22 is displayed on main display portion 18.

Chosen word 22 is configured and displayed to convey several speech parameters corresponding to how the word is spoken. Preferably relative loudness is indicated by the size of the letters of the word, pitch is indicated by the height of the chosen word above the baseline words, and the speed at which each word is spoken is indicated by the spacing of the letters within chosen word 22 or the horizontal width of the letters within chosen word 22.

In the example shown in FIGS. 2B-2D, "blow" is spoken the loudest and so the letters are the largest and "me" is spoken the softest so the letters are the smallest. Another way of showing this is disclosed in FIGS. 3B-3D wherein volume is indicated by changing the size of the letters, but in thickness rather than in width and height. Therefore "blow" is shown with the thickest letters and "me" is shown with the thinnest letters to indicate the loudest and softest spoken words.

The pitch of each chosen word 22 is indicated by its vertical position or height on main display portion 18. The figures indicate that "me" is spoken with the highest pitch and "down" with the lowest pitch. FIGS. 2A-2D indicate the change in pitch within each word by positioning the letters within the chosen words 20. The horizontal position and size of each letter may be changed to reflect its particular pronunciation as well. Note that although chosen words 22 usually will be displayed only in main display portion 18, they may intrude into baseline display 16 area if need be.

The speed at which the individual words are spoken is indicated by the spacing between the letters. "Blow" and "me" are indicated to be spoken at a relatively standard rate while "down" is indicated in FIGS. 2D and 3D to be spoken at a somewhat slower rate.

Other speech parameters may also be indicated by the configuration of the letters. For example color could be used to indicate the mood of the speaker, such as happy, angry or gruff. Different styles of lettering or tilts could also be used to show mood or other qualities of the spoken word. For example, words spoken in a very agitated or excited manner could have very jagged or ragged letter forms.

FIGS. 4A-4E illustrate a technique in which chosen words 22' remain on main display portion 18 as ghost images 24 after the chosen word is spoken. This allows the temporal spacing between the words to be illustrated within the main display portion. Ghost images 24 may remain until a new set of baseline words is displayed along baseline display portion 16.

The example disclosed uses entire words as chosen words 22 displayed within main display portion 18. Other units of speech, such as syllables of words, could be used as well. Therefore as used in this application the term chosen word includes words, syllables or other units of speech. Visual illustrations may be provided in the background of display area 4 if desired. The spelling of baseline words 20 or chosen of words 22, or of both, may be either standard or phonetic. In certain cases it may be desired to present baseline words with the standard spelling and chosen words 22 with the phonetic equivalent.

In use, the student places cartridge 9 within cartridge slot 8 and activates viewer 2 using control 10. The speed at which lines of text are presented within baseline display portion 16 can be controlled using speed control 14. Brightness is controlled using brightness control 12. Although the controls of film strip viewer 2 are shown as rotating knobs, slide type controls can be used for ease of manipulation. A switch which would allow the student to reverse the film strip to repeat a desired passage may also be incorporated into viewer 2. The volume of the vocalized words can be adjusted to suit the student using control 10. The volume can be turned off for certain lessons if desired.

Modification and variation can be made to the disclosed embodiment without departing from the subject of the invention as defined in the following claims.

I claim:

1. A method for teaching reading using an audio-visual projection device, said device including a visual display area, the method comprising the following steps:
   displaying a set of baseline words at a baseline portion of the display area, said words made up of letters;
   displaying a chosen baseline word at a main portion of the display area;
   configuring said chosen word at said main portion according to a first speech parameter;
   positioning said chosen word in said main portion according to a second speech parameter; and
   selectively vocalizing said chosen word simultaneously with said chosen baseline word displaying step.

2. The teaching method of claim 1 wherein said baseline portion is along a lower edge of said main portion.

3. The teaching method of claim 1 wherein said first speech parameter is loudness and said configuring step further comprises the step of adjusting the size of said chosen word in proportion to the loudness of said vocalizing step for said chosen word.

4. The teaching method of claim 1 wherein said second speech parameter is pitch and said positioning step includes the step of vertically positioning said chosen word according to the pitch of said vocalizing step for said chosen word.

5. The teaching method of claim 1 wherein said configuring step further comprises the step of horizontally spacing the letters of said chosen word according to the speed at which said chosen word is vocalized during said vocalizing step.

6. The teaching method of claim 1 wherein the second displaying step includes the step of sequentially displaying said chosen words at said main portion.

7. The teaching method of claim 6 further comprising the step of spacing the baseline words along said baseline portion according to the temporal spacing between the vocalizing of said sequentially displayed chosen words.

8. The teaching method of claim 6 further comprising the step of spacing said sequentially displayed chosen words according to the temporal spacing between the vocalizing of said sequentially displayed chosen words.

9. The teaching method of claim 6 further comprising the step of retaining said sequentially displayed chosen words in an altered state at the display area.

10. The teaching method of claim 9 wherein said altered state is a reduced intensity state.

11. The teaching method of claim 1 wherein the first displaying step includes the step of sequentially displaying sets of baseline words at said baseline portion.

12. The teaching method of claim 11 further comprising the step of adjusting the speed at which said sets of baseline words are displayed.

13. The teaching system of claim 1 further comprising the step of configuring said chosen word according to a third speech parameter.

14. The teaching method of claim 13 wherein said third speech parameter is mood.

15. The teaching method of claim 1 wherein said configuring step includes the step of altering the size of an individual letter of said chosen word.

16. A method for teaching reading using an audio-visual projection device, said device including a visual display area, the method comprising the following steps:
   sequentially displaying sets of baseline words at a baseline portion of the display area, said words made up of letters;
   adjusting the speed at which said sets of baseline words are displayed;
   sequentially displaying individual chosen baseline words at a main portion of the display area;
   configuring said chosen words at said main portion according to a first speech parameter;
   locating said chosen words in said main portion according to a second speech parameter; and
   selectively vocalizing said chosen words simultaneously with said chosen baseline word displaying step.

17. The teaching method of claim 16 wherein:
   said first speech parameter is loudness;
   said configuring step further comprises the step of adjusting the size of said chosen word in proportion to the loudness of said vocalizing step for said chosen word;
   said second speech parameter is pitch; and
   said locating step includes the step of vertically positioning said chosen words according to the pitch of said vocalizing step for said chosen words; and further comprising the step of:
   spacing said chosen words according to the temporal spacing between the vocalizing of said chosen words.

18. The teaching method of claim 17 further comprising the step of horizontally spacing the letters of each said displayed chosen word according to the speed at which said chosen word is vocalized.

* * * * *